United States Patent
Leiser et al.

(10) Patent No.: US 6,225,248 B1
(45) Date of Patent: May 1, 2001

(54) REFRACTORY OXIDATIVE-RESISTANT CERAMIC CARBON INSULATION

(75) Inventors: Daniel B. Leiser; Ming-ta S. Hsu; Timothy S. Chen, all of San Jose, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/184,415

(22) Filed: Nov. 2, 1998

(51) Int. Cl.$^7$ .............................. C04B 35/57; C04B 35/80
(52) U.S. Cl. .............................. 501/95.2; 501/87; 501/99; 428/293.4; 428/312.6; 428/368
(58) Field of Search ................................ 501/95.2, 87, 99; 428/293.4, 312.6, 368

(56) References Cited

U.S. PATENT DOCUMENTS 5,618,766    4/1997    Leiser et al. ............................ 501/87

*Primary Examiner*—Karl Group
(74) *Attorney, Agent, or Firm*—Robert M. Padilla; Carla M. Wong; John G. Mannix

(57) ABSTRACT

High-temperature, lightweight, ceramic carbon insulation is prepared by coating or impregnating a porous carbon substrate with a siloxane gel derived from the reaction of an organodialkoxy silane and an organotrialkoxy silane in an acid or base medium in the presence of the carbon substrate. The siloxane gel is subsequently dried on the carbon substrate to form a ceramic carbon precursor. The carbon precursor is pyrolyzed, in an inert atmosphere, to form the ceramic insulation containing carbon, silicon, and oxygen. The carbon insulation is characterized as a porous, fibrous, carbon ceramic tile which is particularly useful as lightweight tiles for spacecraft.

22 Claims, No Drawings

REFRACTORY OXIDATIVE-RESISTANT CERAMIC CARBON INSULATION

ORIGIN OF THE INVENTION

The invention described herein was made in the performance of work under a NASA Contract and is subject to Public Law 96-517 (35 U.S.C. §200 et seq.). The contractor has not elected to retain title in the invention.

BACKGROUND OF THE INVENTION

Field of the Invention

This invention relates to high temperature, lightweight ceramic insulation such as porous carbon tile comprising carbon, silicon and oxygen. More particularly, the invention relates to a lightweight, ceramic carbon insulation comprising carbon, silicon, and oxygen which is capable of retaining its shape and strength when exposed to an oxidizing environment at temperatures as high as 1700° C. and to the method of preparation which comprises combining carbon substrates with a reaction product derived from the reaction of di- and trifunctional silanes to form a gel and, subsequently heating or pyrolyzing the gel and the carbon substrate, in an inert atmosphere, to form the high temperature, lightweight ceramic insulation.

Space vehicles such as the space shuttle, which leave and reenter the earth's atmosphere, require exterior thermal insulation. The operation of the space shuttle requires the development of lightweight and thermally efficient exterior insulation capable of withstanding a variety of environments. During reentry into the earth's atmosphere, the insulation must maintain the vehicle's exterior structure below 175° C. while experiencing substantial aeroconvective thermal environments which heat the surface of the insulation to temperatures in excess of 1,000° C. In space, the thermal protection must insulate the vehicle from the cold (e.g., −70° C.) experienced while in orbit. In addition to thermal and aeroconvective environments, the insulation must be able to withstand the mechanical stress associated with launch vibrations, acoustics, structural movement of the vehicle's surface, and landing impacts.

For example, lightweight ceramic state-of-the art thermal insulation tiles, as developed by Lockheed (LI-900) and NASA/Ames Research Center (AETB, AIM, FRCI, etc.), are limited to use-temperatures of about 1300° C. in an oxidizing environment. For applications which experience temperatures above 1300° C., a dense ceramic material must be used which adds a substantial weight penalty. Presently, thermal insulation used for protecting space vehicles includes both rigid and flexible ceramic insulation with a carbon composite being used on the leading edges of the vehicle. However, these ceramic carbon composites must be very porous in order to maintain their weight at a reasonably low level. This could be accomplished by using the ultra-high temperature, lightweight, ceramic carbon insulation of this invention.

DESCRIPTION OF THE PRIOR ART

In general, low-density insulations are required to thermally protect the structure of the space shuttle from the high temperatures normally encountered during atmospheric entry. The material developed for the space shuttle was a rigidized fibrous insulation, called reusable surface insulation (RSI). Its density and conductivity were optimized (minimum conductivity and weight) to keep the thermal protection system weight as low as possible, consistent with adequate mechanical properties to increase the resultant payload capability of the vehicle.

A characteristic of a successful insulation is high thermal shock resistance, which is required to survive the rapid temperature changes and high thermal gradients normally incurred during entry. The temperature limitations of prior materials and the desirability of improving their mechanical properties are reasons for developing alternative materials. There is also a need to develop alternative insulation systems for advanced earth-entry vehicles. These needs are relative to the state-of-the-art materials and include improved mechanical properties, higher temperature capability, equivalent thermal shock resistance, low thermal conductivity, and adequate morphological stability.

Presently, composite insulating materials intended for use on orbital reentry vehicles, such as the Space Shuttle, consist of a coating in combination with low-density insulation substrates. Examples of these composites and their use, incorporated herein by reference, are provided in Leiser et al., U.S. Pat. No. 4,148,962, issued Apr. 10, 1979; Fletcher et al., U.S. Pat. No. 3,953,646, issued Apr. 27, 1976; Fletcher et al., U.S. Pat. No. 3,955,034, issued May 4, 1976; and Johnson et al., U.S. Pat. No. 4,612,240, issued Sep. 16, 1986.

More specifically, details regarding ceramic insulations are disclosed, for example, in various other U.S. patents. Leiser et al., U.S. Pat. No. 5,618,766, issued Apr. 8, 1997, discloses lightweight ceramic compositions comprising a porous carbon preform. The carbon preform contains a tetralkoxy silane, a dialkoxy silane, and a trialkyl borate. Riccitiello et al., U.S. Pat. No. 4,713,275, issued Dec. 15, 1987, relates to a ceramic tile for use in a thermal protection system, employing a ceramic cloth having additional ceramic material deposited therein.

Jouffreau, U.S. Pat. No. 4,804,571, issued Feb. 14, 1989, relates to a thermal protection system for reentry vehicles or high speed aircraft including multiple refractory tiles of varying thickness defined by thermal requirements at the point of installation. Seibold et al., U.S. Pat. No. 4,100,322, issued Jul. 11, 1978, relates to a high thermal capacity fiber-resin-carbon composites having a polymer resin filler. The composite is prepared by impregnating a woven fabric of carbon or graphite yarn with a resin, curing the resin, pyrolyzing the impregnated fabric, and re-impregnating the resulting fiber-porous carbon char composite with resin.

Owens et al., U.S. Pat. No. 4,605,594, issued Aug. 12, 1986, relates to a ceramic article including a woven ceramic cloth having a non-porous core and a porous periphery prepared by treating with an acid. The porous periphery can be infiltrated with materials such as a metal, a metal oxide, a catalyst and an elastomer. The articles can be used as fiber optic elements, catalyst supports and heat resistant tiles for aerospace purposes. Gardner et al., U.S. Pat. No. 5,154,787, issued Oct. 13, 1992, describes a method of manufacturing prepreg mats. A prepreg strand formed of inorganic fibers impregnated with a thermoplastic binder or a ceramic matrix powder is heated, cooled and compacted to fuse into a uniform, dense prepreg. Geltman, U.S. Pat. No. 3,533,813, issued October 1970, relates to a low density, nonstructural ceramic employing a porous ceramic support in combination with organic fillers. The process includes burning off the organics to form pores within the ceramic. This process reduces the mass of the composite, thereby reducing its density while maintaining inherent strength.

SUMMARY OF THE INVENTION

This invention relates to lightweight, high-temperature, ceramic insulation, e.g., a carbon tile comprising carbon, silicon, and oxygen derived from the reaction of an organodialkoxy silane and an organotrialkoxy silane to form a sol-gel in the presence of a porous carbon substrate. More particularly, the invention relates to an oxidation resistant, ceramic carbon substrate containing carbon, silicon, and oxygen, and to the method of preparing a ceramic carbon insulation, e.g., a carbon tile capable of retaining its shape and strength when exposed to an oxidizing environment at temperatures in excess of 1200° C. The method of this invention comprises coating or impregnating a porous carbon substrate with a reaction product derived from the reaction of dialkoxy and trialkoxy silanes such as di- and tri-functional silane to form a gel, in situ, or in the presence of the porous carbon substrate followed by drying the carbon substrate and subsequently heating or pyrolyzing the infiltrated carbon substrate, in an inert atmosphere, to form the ceramic carbon insulation.

The preferred di- and tri-functional alkoxides include the silicon alkoxides having di- and tri-oxygen functionality in which the silicon alkoxide has two and three Si—O bonds, respectively. In some instances, the trialkoxy silane can be replaced with up to about 50% by weight with a tetralkoxy silane. Preferably, the tetralkoxy silane can replace the trialkoxy silane in amounts ranging from about 5 to 25% by weight and are characterized as having hydrocarbon groups of 1 to 12 and preferably 1 to 4 carbons in each alkyl group.

The silanes particularly useful in the practice of this invention include a combination of silanes with tri- and di-oxygen functionality of the general formula $(R^{I}O)_3$—Si—R and $(R^{II}O)_2$—Si—$R^{III}R^{O}$ wherein $R^{I}$ and $R^{II}$ are the same or different and represent alkyl hydrocarbon groups or radicals of 1–12 carbons and wherein R, $R^{O}$ and $R^{III}$ are different or the same hydrocarbon groups as $R^{I}$ and $R^{II}$, provided that either $R^{III}$ or $R^{O}$ is a hydrogen atom. The groups R, $R^{III}$ and $R^{O}$ can be the same or different hydrocarbon group of 1 to 12 carbons and include the alkyl, aryl, alkaryl, and aralkyl groups. The hydrocarbon groups, i.e., (—CH), contain carbon and hydrogen and include the straight or branched chains, and saturated or unsaturated groups of 1 to 12 carbons. In general, the number of carbon atoms in the hydrocarbon groups range from 1–12 and more typically from 1–8 or 1–4.

Gelation of the di- and trialkoxy silanes is catalyzed by the addition of an acid or base, such as nitric acid, $H_2SO_4$, HCl, KOH, NaOH or ammonium hydroxide, etc. In some applications it may be appropriate to use additional solvents such as alcohol, acetone, or other such solvents. This can expedite fast drying, and may serve to dilute or further liquefy the gel to allow thinner application when appropriate.

The gel is dried within the porous carbon substrate prior to pyrolysis, i.e., high temperature treatment in an inert atmosphere to form the ceramic carbon substrate. The ceramic tile is formed by pyrolyzing or heating the gel-coated carbon substrate, in an inert atmosphere, at temperatures ranging from about 800° to 1500° C. and preferable from 1200° to 1500° C. When a very high temperature is used, the time required for pyrolyzation is substantially decreased. However, with a sensitive substrate, or where there are needs for lower production costs, lower temperatures can be used for longer periods. This may be particularly important for a very large substrate because very large baking ovens tend to have a lower temperature maximum. Moreover, when the substrate is relatively thick, the time required for uniform pyrolyzation throughout the entire monolith will require more extended periods. This will be easily ascertained by one of ordinary skill in the art. A large enough monolith may require several days of treatment for the center regions to be fully pyrolyzed.

The molar ratio of the silicon, oxygen, and carbon in the reaction product used to prepare the ceramic carbon insulation of this invention is determined by the molar ratio of the di- and trialkoxy silanes in the reaction and in some instances by the molar ratio of the tetralkoxy silane. The carbon content of the ceramic insulation is determined also by the carbon of the porous carbon substrate and the carbon content of the Si—C bonds in the alkoxy silanes. The lightweight, oxidation-resistant ceramic carbon tiles of this invention, useful in advanced space vehicles, are made by coating or impregnating a porous carbon preformed substrate by forming the gel, in situ, followed by drying and pyrolysis. The porous carbon substrate reacts with the gel derived from the mixture of alkoxy silanes to become part of the ceramic insulation. The porous carbon preform provides the structure for the resultant porous, lightweight temperature-resistant ceramic tile.

Accordingly, it is an object of this invention to provide high temperature, lightweight ceramic carbon insulation, e.g., carbon tile, for use at temperatures as high as 1700° C.

It is another object of this invention to provide a method of preparing high-temperature, lightweight carbon ceramic insulation derived from the reaction of alkoxy silanes containing silicon, oxygen, and carbon for use on nuclear reactors, spacecraft nose tips, and various other leading edges, as well as other high heat uses such as vulcanology uses.

It is another object of this invention to provide ceramic carbon insulation tile which has high-temperature characteristics and high tensile strength, which is lightweight, and which is capable of being formed into any desired shape.

It is a further object of this invention to provide ceramic carbon tile containing siloxane derived from the reaction of different alkoxy silanes including a combination of dialkoxy silanes, trialkoxy silanes, and tetralkoxy silanes, for use on space vehicles, which has high-temperature characteristics and high tensile strength, and which is lightweight.

These and other objects of the invention will become apparent from a further and more detailed description of the invention.

DETAILED DESCRIPTION OF THE INVENTION

This invention relates to an oxidation resistant, lightweight, amorphous ceramic insulation comprising carbon, silicon, and oxygen, and to a method for preparing the insulation which comprises coating or impregnating a porous carbon substrate with a siloxane gel derived from the reaction of di- and trialkoxy silanes such as di- and trifunctional silanes to form a sol-gel, in situ, with the carbon substrate, followed by drying the substrate and subsequently heating or pyrolyzing the coated carbon substrate, in an inert atmosphere, to form the ceramic carbon insulation or tile. In a preferred embodiment for forming the lightweight, porous ceramic tile of this invention, the carbon substrate comprises a preform of a particular size, shape, and configuration. For example, the carbon substrate can be a carbon preform comprising lightweight, porous carbon felts useful as preforms for making lightweight, porous, ceramics which are suitable for use as thermal insulating tiles for reentry space vehicles, such as the space shuttle.

In this embodiment, the porous carbon preform is coated by immersion or impregnating (infiltrated) with an effective amount of sol-gel, i.e., is saturated with the siloxane gel, wherein the gel is dried onto the carbon preform to form a ceramic precursor. The ceramic precursor is subsequently pyrolyzed in an inert atmosphere, whereby the dried gel and the carbon of the preform react to form the ceramic insulation of this invention which has the same size, shape, and configuration as the carbon preform. Multiple impregnations with the sol, gelling, drying, and heating, i.e., pyrolyzing, after each impregnation can be used to achieve the desired weight, strength, and high-temperature oxidation stability required of the ceramic.

For purposes of this invention, the preferred di- and trifimctional alkoxide reactants include the alkoxides of silicon having two and three Si—O bonds, respectively. Particularly preferred silanes comprise a combination of silanes with tri- and dioxygen functionality having the general formula $(R^{I}O)_3$—Si—R and $(R^{II}O)_2$—Si—$R^{III}R^{O}$ wherein R, $R^{I}$, $R^{II}$, $R^{III}$ and $R^{O}$ are the same or different and represent hydrocarbon radicals of 1–12 carbons; provided that either $R^{III}$ or $R^{O}$ is a hydrogen atom, $R^{I}$ and $R^{II}$ are alkyl radicals, and R, $R^{III}$ or $R^{O}$ is an alkyl, aryl or substituted aryl radical of 1 to 12 carbons. The term hydrocarbon, or organo groups, are radicals comprising carbon and hydrogen (—CH) which may be straight or branched chain, saturated or unsaturated, hydrocarbons.

In general, the number of carbon atoms in the hydrocarbon or organo groups range from 1–12 and preferably from 1–8, and more preferably 1–4 carbons, e.g., 1–2 carbons, wherein at least one of the hydrocarbon groups contain at least two carbon atoms, e.g., ethyl group and either $R^{III}$ or $R^{O}$ is hydrogen. The R, $R^{I}$, $R^{II}$, $R^{III}$, and $R^{O}$ groups of the above formulae are preferably lower alkyl groups, e.g., 1 to 8 carbons such as methyl, ethyl, propyl, isopropyl, butyl, isobutyl, pentyl, hexyl, heptyl, etc., their isomers, or mixtures thereof, and include the alkenyl or vinyl unsaturated groups such as vinyl, divinyl, propenes, butenes, etc., and various mixture thereof. Provided, however, that either $R^{III}$ or $R^{O}$ is a hydrogen atom and the alkoxy groups, i.e., the $R^{I}$ and $R^{II}$ of the silanes, are alkyl radicals of 1 to 12 carbons and preferably $C_1$ to $C_4$ carbons. The R, $R^{III}$, and $R^{O}$ groups, in the above formulae, include all of the above alkyl groups of 1–12 carbons, and also other hydrocarbon groups including the aryl, aralky, and alkaryl radicals such as phenyl and the lower alkyl substituted aryl groups and mixtures thereof.

Specific examples of the preferred silanes useful for preparing the siloxanes of this invention include the alkyltrialkoxy silanes such as the methyltrimethoxysilane $CH_3Si(OCH_3)_3$, ethyltrimethoxysilane $C_2H_5Si(OCH_3)_3$, methyltriethoxysilane $CH_3Si(OC_2H_5)_3$, and the alkyldialkoxy silanes such as the methyldiethoxysilane $(CH_3)Si(OC_2H_5)_2$, methyldimethoxysilane $(CH_3)Si(OCH_3)_2$, ethyldiethoxysilane $(C_2H_5)Si(OC_2H_5)_2$, ethydibutoxysilane $(C_2H_5)Si(OC_4H_9)_2$, vinyldiethoxysilan $(CH_2:CH)Si(OC_2H_5)_2$ and phenyldimethoxysilane $(C_6H_5)Si(OCH_3)_2$ and various combination thereof in any ratios, provided that either the $R^{III}$ or $R^{O}$ group in the dialkyoxy silane is hydrogen.

The siloxane sol-gel is prepared by reacting the alkoxy silanes in the presence of the porous carbon substrate in an alcohol medium containing some water, e.g., up to about 10% by weight of the alcohol. The weight ratio between the dialkoxy silane and the trialkoxy silane ranges from about 1.0 part by weight of the dialkoxy to 1.0 to 20 parts by weight of the trialkoxy silane and preferably from about 1.0 to 10 parts by weight of the trialkoxy silane. Where a tetralkoxy silane is used, then up to about 50% by weight of the trialkoxy silane can be replaced with the tetralkoxy silane. The alcohol insures that a homogeneous sol-gel is obtained. While it is convenient to use ethanol, other lower alcohols may be used alone or in admixture. Examples of the alcohol media include methanol, ethanol, propanol, isopropanol, butanol, sec- and isobutanol, pentanol, and mixtures of such alcohols.

Although the sol may be gelled by aging at ambient temperatures or by heating, in the practice of this invention it is preferred to catalyze gelation by the addition of a mineral acid, e.g., $HNO_3$, HCl, etc., or base such as NaOH, KOH ammonium hydroxide, etc., to the reaction mixture. Mineral acids such as nitric acid or bases such as ammonium hydroxide are particularly useful as gelling agents. Gelation will occur at ambient conditions, but heating to temperatures of from about 40°–90° C. is preferred in addition to the use of the acid or base catalyst.

A lightweight, rigid, ceramic tile of this invention is formed by using a lightweight, porous carbon preform, such as a carbon tile or felt. When using a lightweight, porous carbon preform, as the substrate, in the form of a porous carbon tile, with an acid or base to catalyze the reaction, the preform is impregnated (or infiltrated) by immersion into the sol before gelling occurs to coat the carbon. After gelation, the impregnated preform is removed from the gel, the surplus is removed, and the impregnated preform is dried in an oven or at ambient conditions to form the ceramic precursor. Vacuum drying (e.g., overnight at 70–100° C.) is preferred to insure that all volatiles are removed prior to the inert atmosphere pyrolysis.

More specifically, the ceramic is formed by heating the carbon substrate at temperatures in the range of from about 800° C. to 1500° C. During the high-temperature, inert atmosphere pyrolysis, the carbon of the preform enters into the pyrolysis reaction with the dried gel and forms part of the ceramic. The inert atmosphere includes a vacuum or an atmosphere of one or more of the inert gasses, such as argon, etc.

When making a porous ceramic tile from a flexible or rigid porous carbon substrate, multiple impregnations of the carbon are typically necessary in order to achieve the desired weight of the ceramic tile, with drying and inert gas pyrolysis following each impregnation. The weight ratio between the carbon substrate and the gel is about one part by weight of the carbon substrate to 2–10 parts by weight of the siloxane gel.

A preferred embodiment of the invention involves three iterations of the impregnation and drying process. This preferred product has been tested at 1700° C. and may be stable at even higher temperatures. This multiple impregnation technique involves the advantage of tailoring the insulated tiles to specific anticipated heat range challenges. For instance, a very high temperature resistant, but relatively high density tile, can be provided for the nose cone area, but tiles of lower temperature resistance and a much lower density can be provided for the rear and sides of a re-entry vehicle. This allows less expensive production and minimal weight loading. For more commercial implementations, such as firewalls, nuclear power facility safety walls, vulcanology applications, and other high temperature applications, similar tailoring can be achieved using this approach.

An additional benefit of the multiple impregnation and drying process is that additional structural strength characteristics, such as tensile and compressive strength, resistance to shattering, and the like, are improved. This is particularly important because a single application of the impregnation and drying process may not increase the substrate's initial structural strength characteristics.

In accordance with this invention, the reaction of the alkyltrialkyoxy silanes and alkyldialkyoxysilanes in the presence of an acid or base in an alcohol medium form a gel, in situ, in the presence of the carbon substrate. The reaction of the silanes takes place in the presence of the porous carbon substrate as illustrated by the following reaction:

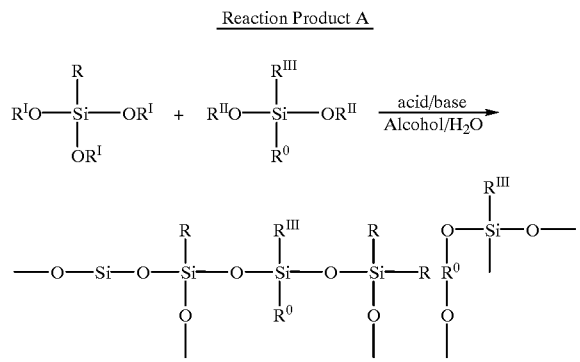

Reaction Product A

Product A is a clear siloxane gel containing silicon, carbon, and oxygen in the ratios of about Si, $C_{0.4-1.5}$ and $O_{1-2}$. After drying and pyrolyzing at 1200° C. in an inert environment, it becomes a black ceramic comprising silicon, oxygen, and carbon, and was found to be stable in an oxidizing environment at temperatures as high as 1700° C. However, this product was too dense for use (2.1 g/cm$^3$), and the product gel shrinks and cracks when heated. The same alkoxy silanes, however, when reacted in conjunction with a porous carbon substrate, e.g., a porous carbon felt, resulted in a suitable insulation after pyrolyzation. It was found that the reaction of the alkoxy silanes in the presence of a porous carbon substrate, e.g., a porous carbon tile or felt, resulted in suitable insulation which had improved high temperature characteristics, was light in weight, had high tensile strength, and could be formed into the desired shape for various uses.

In accordance with this invention, in order to make a lightweight tile and incorporate the desired ultrahigh temperature properties, a lightweight carbon tile (~10 lb/ft$^3$) was used both as a source of carbon and as a frame/network substrate for the siloxane gel. When pyrolyzed in an inert environment with an excess of carbon, e.g., the carbon tile, the pyrolysis of the reaction product results in more —Si—C—Si— bonds and less —Si—O—C— bonds. The —Si—C—Si— structure is known to be more stable at high temperatures than the —Si—O—C structure.

By gelling the reaction product of the silanes inside the lightweight carbon tile and pyrolyzing the gel and carbon together in an inert environment, a lightweight carbon tile is converted to an —Si—C—Si—O—C— lightweight ceramic tile. The reaction takes place, in situ, with the carbon substrate wherein the weight ratio between the dialkoxy silane and the trialkoxy silane ranges from about 1.0 part by weight of the dialkoxy silane to 1–20 parts by weight of the trialkoxy silane and preferably from about 1.0 part to 10 parts to form the siloxane gel. The porous carbon substrate is completely impregnated or saturated with the siloxane gel prior to the pyrolyzation in an inert atmosphere.

The following examples illustrate the preparation of the ceramic carbon insulation materials, i.e., carbon tiles, in accordance with this invention.

EXAMPLE 1

Methyltrimethoxysilane (2.0 g) and methyldimethoxysilane (0.5 g) were mixed with 1.0 ml of 1.0 N HNO$_3$. The gel formed within 5 min. One piece of the dry gel (0.03042g) was pyrolyzed at 1200° C. in argon for one hour. A hard black char of 0.2078 g was obtained. This black ceramic is stable to 1500° C. in air.

EXAMPLE 2

A piece of carbon tile (0.7058 g) was immersed in a freshly prepared solution of methyltrimethoxysilane (10.0 g), methyldimethoxysilane (2.5 g) and 1.0 N HNO$_3$ solution (2 ml). After the solution gelled, the carbon tile was removed from the gel and dried in a vacuum oven at 70° C. for 2 hours. The tile was then pyrolyzed at 1000° C. for 50 min. and 1500° C. for 30 min. in argon, and weighed 1.6688 g. The tile survived an oxidation exposure of 1000° C. for 10 min., and weighed 1.3719 g. After another oxidation exposure at 1000° C. for 30 min., the tile collapsed and the black powder weighed 1.0812 g.

EXAMPLE 3

A piece of carbon tile (1.0155 g, 1"×1"×½") was immersed in a freshly prepared solution of methyltrimethoxysilane (10.0 g), methyldimethoxysilane (2.5 g), and 1.0 N HNO$_3$ (2.5 ml). After the reaction product gelled, excess material was removed and dried. The carbon tile was pyrolyzed at 1200° C. in argon for one hour and weighed 2.9266 g. The same procedure was repeated twice and the tile weighed 5.1442 g. After a one-hour oxidation exposure at 1000° C., the tile was structurally sound and weighed 4.2026 g. After another hour of oxidation exposure at 1200° C., the tile was still good and weighed 4.1922 g. After an additional hour of oxidation exposure at 1500° C., the tile survived, but structurally was not sound.

EXAMPLE 4

A piece of carbon tile (Oak Ridge) (1.9085 g, 1"×1"×½") was immersed in a freshly prepared solution of methyltrimethoxysilane (10.0 g), methyldimethoxysiane (2.5 g) and 1.0 N HNO$_3$ (2.5 ml). After the reaction product gelled, and dried, the filled tile was pyrolyzed in argon at 1200° C. for 60 min. and weighed 4.4018 g. The same procedure was performed two more times and a further pyrolyzed at 1350° C. in argon for 30 min. The final tile weighed 7.3048 g.

The following oxidation treatments were performed on the tile from Example 4. The tile survived structurally sound and did not change its shape.

| | | |
|---|---|---|
| 1) | one hr. at 1100° C. | Weight after 6.4049 g |
| 2) | one hr. at 1300° C. | Weight after 5.5870 g |
| 3) | one hr. at 1500° C. | Weight after 5.6910 g |
| 4) | one hr. at 1600° C. | Weight after 5.7148 g |
| 5) | one hr. at 1700° C. | Weight after 5.7215 g |

EXAMPLE 5

A piece of carbon tile (FMI) (2.0612 g, 1" cube) was immersed in a freshly prepared solution of methyltrimethoxysilane (16.0 g), methyldimethoxysilane (2.0 g), and 1.0 N HNO$_3$ (4.0 ml). After the reaction product gelled and dried, it was pyrolyzed at 1250° C. in argon for one hour. It weighed 7.1877 g. The same gel-dry procedure was performed again and the tile was pyrolyzed at 1500° C. in argon for one hour. It then weighed 8.5108 g.

The following oxidation treatments were performed on the tile of Example 5. The tile survived and was a good product.

| 1) | one hr. at 1100° C. | Weight after 7.8819 g |
|---|---|---|
| 2) | one hr. at 1300° C. | Weight after 7.8817 g |
| 3) | one hr. at 1500° C. | Weight after 7.9696 g. |

EXAMPLE 6

A piece of carbon tile (FMI) (2.0300 g, 1" cube) was immersed in a freshly prepared solution of methyltrimethoxysilane (20.0 g ), methyldimethoxysilane (1.6 g) and 1.0 n $HNO_3$ (4 ml). After the reaction product gelled and dried, it was pyrolyzed in argon at 1250° C. for one hour, and weighed 7.2507 g. The same gel-dry procedure was performed again on this tile and it was later pyrolyzed at 1500° C. in argon for one hour. The tiles final weight was 8.8424 g. The tile survived structurally sound and held its shape after the following oxidation treatments.

| 1) | one hr. at 1300° C. | Weight after 8.3176 g |
|---|---|---|
| 2) | one hr. at 1500° C. | Weight after 8.4551 g |

EXAMPLE 7

A piece of carbon tile (FMI) (2.0474 g, 1" cube) was immersed in a freshly prepared solution of methyltrimethoxysilane (20.0 g), methyldimethoxysilane (2.0 g), water (5.0 g), and 5.6% ammonium hydroxide (1.5 ml). After the reaction product gelled and dried, it was pyrolyzed at 1200° C. in argon for one hour and weighed 5.7939 g. The tile was oxidized at 1200° C. for 30 min. and totally collapsed.

EXAMPLE 8

A piece of carbon tile (FMI) (2.1019 g, 1" cube) was immersed in freshly prepared solution of methyltrimethoxysilane (20.0 g), methyldimethoxysilane (4.0 g), water (2 ml) and 0.5 N ammonium hydroxide (3.5 ml). After the reaction product gelled and dried, it was pyrolyzed at 1150° C. in argon for one hour and weighed 5.8255 g. The same procedure was performed twice more and the tile weighed 10.4555 g.

This tile survived structurally sound and held its shape after having gone through the following oxidation treatments.

| 1) | one hr. at 1200° C. | Weight after 8.4615 g |
|---|---|---|
| 2) | one hr. at 1300° C. | Weight after 8.4500 g |
| 3) | one hr. at 1400° C. | Weight after 8.4930 g |
| 4) | one hr. at 1500° C. | Weight after 8.5517 g |

EXAMPLE 9

Three pieces of 1" cube carbon tile (FMI) (~2.30 g/ea.) were immersed in a freshly prepared solution of methyltirmethoxysilane (40.0 g), methyldimethoxysilane (8.0 g), water (2 ml), and 0.5N ammonium hydroxide (8.0 ml). After the reaction product gelled and dried, the three pieces were pyrolyzed at 1200° C. in argon for one hour and weighed 4.97 g, 4.96 g, and 4.79 g. The same procedures were performed twice more and their weights were 9.64 g, 9.44 g, 9.43 g. All three pieces survived after having gone through the following oxidation treatments.

| 1) | one hr. at 1200° C. | Weights after 8.12 g, 7.52 g, 7.30 g |
|---|---|---|
| 2) | one hr. at 1350° C. | Weights after 7.89 g, 7.42 g, 7.39 g |
| 3) | one hr. at 1600° C. | Continue to 1700° C. |
| 4) | one hr. at 1700° C. | Weights after 7.51 g, 7.33 g, 7.32 g |

Results before and after oxidation treatment of tile:
Before any oxidation: Si, $C_{0.4-1.5}$, $O_{1-2}$
After massive oxidation: Si, $C_{0.2-0.8}$, $O_{1-3}$
The data was derived from elementary analysis.
The following Table I illustrates the tensile strength of the carbon tiles prepared in accordance with this invention.

TABLE I

Tensile Strength of Ultra High-Temp. Materials

| Sample No. | Pyrolysis Conditions (Argon) | Oxidation Conditions | Tensile Strength (R.T.) |
|---|---|---|---|
| I | 1250° C., One hr. | None | 100 psi |
| II | 1250° C., One hr. 1500° C., One hr. | None | 330 psi |
| III | 1250° C., One hr. | 1200° C., One hr. 1500° C., One hr. 1600° C., One hr. | 50 psi |
| IV | 1250° C., One hr. | 1200° C., One hr. 1400° C., One hr. 1700° C., One hr. | 52 psi |
|  | 1500° C., One hr. | 1400° C., One hr. 1700° C., One hr. |  |

It is understood that various other embodiments and modifications in the practice of the invention will be apparent and can be made by those skilled in the art without departing from the scope and spirit of the invention as set forth in the appended claims.

The invention claimed:

1. An oxidation-stable, high-temperature, lightweight ceramic insulation obtained by pyrolyzing a siloxane gel impregnated, carbon substrate consisting essentially of $Si_aC_bO_c$, wherein the value of a is 1, the value of b ranges from 0.2–1.5, and the value of c ranges from 1–3.

2. The insulation of claim 1, wherein the ratio of the carbon substrate to the siloxane gel is about one part carbon substrate to 1.0 to 10 parts siloxane gel by weight.

3. The insulation of claim 2, wherein the ratio of the carbon substrate to the siloxane gel is about one part carbon substrate to 3 to 7 parts siloxane gel by weight.

4. The insulation of claim 3, wherein the ratio of the carbon substrate to the siloxane gel is about one part carbon substrate to 4 to 5 parts siloxane gel by weight.

5. The insulation of claim 1, wherein said siloxane gel comprises the following:

a.) at least one dialkoxy silane having the formula $(R^{II}O)_2$—Si—$R^{III}R^O$ wherein $R^{II}$ is an alkyl radical of 1 to 12 carbons and either $R^{III}$ or $R^O$ is a hydrocarbon radical of 1 to 12 carbons and either $R^{III}$ or $R^O$ is hydrogen, and b.) at least one trialkoxy silane having the formula $(R^IO)_3$—Si—R wherein $R^I$ is an alkyl radical of 1 to 12 carbons and R is the same or different from $R^I$ and is a hydrocarbon radical of 1 to 12 carbons.

6. The insulation of claim 5, wherein the ratio of (a) to (b) by weight is from 1:1–20.

7. The insulation of claim 6, wherein the ratio of (a) to (b) by weight is from 1:2–6.

8. The insulation of claim 7, wherein the ratio of (a) to (b) by weight is from 1:4–5.

9. The insulation of claim 5, wherein $R^I$ and $R^{II}$ of the dialkoxy silane (a) and the trialkoxy silanes (b) are alkyl radicals of 1 to 8 carbon atoms, and the $R^{III}$ of the dialkoxy silane is a hydrocarbon radical of 1 to 12 carbon atoms and $R^O$ is hydrogen or other hydrocarbon radicals.

10. The insulation of claim 9, wherein R, $R^I$, $R^{II}$ and $R^{III}$ of the di- and trialkoxy silanes are alkyl radicals of 1 to 4 carbon atoms.

11. The insulation of claim 10, wherein R, $R^I$, $R^{II}$ and $R^{III}$ of the di- and trialkoxy silanes are alkyl radicals of 1 to 2 carbon atoms.

12. The insulation of claim 11, wherein R, $R^I$, $R^{II}$ and $R^{III}$ of the di- and trialkoxy silanes is an alkyl radical of 1 carbon atom.

13. The insulation of claim 1, wherein the porous carbon substrate is fibrous, low-density carbon tiles.

14. The insulation of claim 1, wherein said insulation retains its insulating properties and physical structure at temperatures of about 700° C.–2400° C.

15. The insulation of claim 14, wherein said insulation retains its insulating properties and physical structure at temperatures of about 1200° C.–1900° C.

16. The insulation of claim 15, wherein said insulation retains its insulating properties and physical structure at temperatures of about 1500° C.–1700° C.

17. The insulation of claim 1, wherein said pyrolyzing occurs in an inert atmosphere at temperatures from about 1000° C.–1700° C.

18. The insulation of claim 17, wherein said pyrolyzing occurs in an inert atmosphere at temperatures from about 1100° C.–1500° C.

19. The insulation of claim 18, wherein said pyrolyzing occurs in an inert atmosphere at temperatures from about 1200° C.–1300° C.

20. The insulation of claim 1, wherein the insulation has undergone multiple impregnation and pyrolyzation iterations.

21. The insulation of claim 5, wherein said siloxane gel further comprises at least one tetralkoxy silane having the formula $(R^IO)_4$—Si wherein $R^I$ is an alkyl radical of 1 to 12 carbons and preferably 1 to 4 carbons and replaces said trialkoxy silane in amounts up to 50% by weight.

22. The insulation of claim 21, wherein said tetralkoxy silane replaces said trialkoxy silane in amounts from about 5 to 25% by weight.

* * * * *